United States Patent [19]

Kiriu

[11] Patent Number: 4,459,688

[45] Date of Patent: Jul. 10, 1984

[54] ACCESS REQUEST SELECTING CIRCUIT

[75] Inventor: Yoshio Kiriu, Hadano, Japan

[73] Assignee: Hitachi, Ltd., Tokyo, Japan

[21] Appl. No.: 210,172

[22] Filed: Nov. 25, 1980

[30] Foreign Application Priority Data

Nov. 26, 1979 [JP] Japan .................. 54-152086

[51] Int. Cl.³ .............................................. G11C 8/00
[52] U.S. Cl. ................................................. 365/230
[58] Field of Search ............... 365/222, 230, 233, 189, 365/195

[56] References Cited

U.S. PATENT DOCUMENTS 3,811,117 5/1974 Anderson, Jr. .................. 365/222

Primary Examiner—James W. Moffitt
Attorney, Agent, or Firm—Antonelli, Terry & Wands

[57] ABSTRACT

An access request selecting circuit for selectively accepting access request signals produced from a plurality of access request sources. Different series of recurrent time intervals are assigned to the access request sources. When a memory request signal is supplied from an access request source in a series of recurrent time intervals which are assigned to the access request source such a memory request signal is accepted. At this time, if an attendant signal produced in association with the memory request signal is supplied, this attendant signal is also accepted.

14 Claims, 12 Drawing Figures

ACCESS REQUEST SELECTING CIRCUIT

BACKGROUND OF THE INVENTION

1. Field of the Invention

The present invention relates to an access request selecting circuit for selectively accepting one by one access request signals produced from a plurality of access request sources.

2. Description of the Prior Art

The usage of, a dynamic type MOS memory element is increasing and is widely being used as a memory element for a memory unit. Under the circumstances, even the memory unit belonging to a data processing system of a relatively smaller capacity needs a selector circuit which is capable of selectively accepting an address signal issued by a processor unit or basic processing unit (BPU) and refresh address signal in order that requests for refreshing operation for maintaining information stored in the memory elements may be processed in addition to the access request from the basic processor unit (BPU). In the case of a data processing system of a large capacity, incorporating a plurality of processors, a selector circuit is required which is additionally capable of discriminating the input signals such as address signals, store data or the like which are issued by any specific processor in processing the access requests from the plurality of the processors. It is known to provide a storage control unit (SCU) in place of the selector circuit for the memory device. However, the system in which the selector circuit or a part thereof is provided for the memory unit is more frequently adopted for the reasons mentioned below. One of the reasons is that there are a great number of interleaves to the memory unit in the processing system of a large or very large capacity, resulting in that the logical quantities to be processed are increased to an amount which is beyond the processing capability of the storage control unit or otherwise require an extremely large scale storage control unit which will render the data processing system to be poor in flexibility and thus reduce the utility of the processing unit as the general purpose data processor for use in various data processing systems of different capacities. For example, considering only the store data, the selector circuit is required to have a capacity corresponding to 128 bytes in the case of interleaves of 16 ways on the eight-byte base. The second reason can be seen in the fact that the memory unit is usually provided with a register for holding addresses, store data or the like transmitted from access sources such as the storage control unit, which register may serve also as a register for holding the input signals selected by the selector circuit. In contrast, when the selector circuit is provided in the storage control unit, a further register has to be incorporated in the storage control unit for holding the input signals selected by the selector circuit in addition to the register which is provided in the memory unit, involving an increased number of gate stages as well as an increased quantity of hardware. The primary reason why the register is commonly incorporated in the memory unit is that the cycle time of the memory unit is five to ten times as long as that of the access source such as the storage control unit. If the storage control unit itself has to hold addresses, updating of the addresses will be impossible and therefore another access thereto will be also impossible until completion of one cycle of memory operation. Thus, by supplying addresses to memory elements so that they are held in the memory elements, the storage control unit is allowed to update the addresses and access different areas of the memory unit successively. Further, the increased storage capacity of the individual memory devices owing to the possibility of implementing the semiconductor memory device with a high density as is typical in the case of the dynamic type MOS memory has paved the way for incorporating the selector circuit in the memory unit in view of the fact that the increased storage capacity of the individual memory device allows the logical control quantities for the memory unit to be increased without being accompanied by any appreciable disadvantages. More specifically, when the individual memory devices are of a small storage capacity, the logical control quantities for the whole memory unit will become increased as compared with the overall available storage capacity, involving a correspondingly disadvantageous lessened efficiency. However, the memory device imparted with an increased storage capacity can evade such a shortcoming and make it possible to incorporate the selector circuit in the memory unit with a substantially same effect as the one combined with the storage control unit.

It should however be mentioned that incorporation of the selector circuit for selectively discriminating only the input signals such as address signal and the like from the access source the access request of which is accepted from those incoming from other access sources brings about a problem that the access time to the memory unit is increased. In the hitherto known system, the input signal such as the address signal which is in company with the access request is allowed to be received or utilized in the memory unit only after the selector circuit has been enabled by a selector gating signal which is produced in response to the access request.

FIG. 1 illustrates schematically known arrangement of a typical selector circuit which is combined with access sources constituted by a processing unit or BPU and a refresh request source, and FIG. 2 illustrates a signal-timing diagram to illustrate operation of the selector circuit shown in FIG. 1. In these figures, reference numeral 1 denotes a synchronizing circuit for synchronizing the fresh request, 2 and 3 denote AND gates, 4 and 5 denote flip-flops, 6 and 7 denote inverters, 8 denotes a selecting circuit and 9 denotes an address register, while 10 represents the access request from BPU, 11 represents a synchronizing clock signal, 12 represents a refresh request signal, 13 represents an output signal from the synchronizing circuit 1, 14 represents a BPU select signal, 15 represents a refresh select signal, 18 represents an address signal from the BPU, 19 represents a refresh address signal, 20 represents an address signal selected by the selecting circuitry 8, and 21 represents the output signal from the address register. Referring to FIG. 1, the time at which the access request 10 is supplied is limited to time points indicated by inverted triangular marks (∇) shown in FIG. 2 by the timing of a clock (not shown) at which the access request is issued by the BPU. The refresh request signal 12 is so synchronized by the synchronizing circuit 1 that the signal 12 is out of phase relative to the access request 10 by 180°. In other words, the time at which the synchronized refresh request signal 13 is generated is limited to the time points indicated by triangular marks (Δ) in FIG. 2. In the case of the illustrated circuit arrangement, the synchronizing circuit 1 is constituted by two stages of flip-flops in order to prevent the request signal from being fetched in an uncertain state. At the time point indicated by the second triangle mark (Δ) as counted from the left, the first flip-flop stage is set, while the second flip-flop stage is set at the time point indicated by the third triangle mark (Δ), whereupon the refresh request signal is produced.

The access request signal 10 and the refresh request signal 13 which are produced at a phase angle of 180° relative to each other are fed to the flip-flops 4 and 5 through the AND gates 2 and 3, respectively. Since the access request signal is out of phase with the synchronized refresh request signal 13 by 180°, it will never occur that both the flip-flops 4 and 5 are set simultaneously, but either the flip-flop 4 or 5 is set in dependence on which of the associated AND gates 2 and 3 receives the request signal 10 or 13 at an earlier time. In the illustration of FIG. 2, it is assumed that the access request 10 has been accepted earlier. When the flip-flops 4 or 5 (flip-flop 4 in the illustrated case) is thus set, the AND gates 2 and 3 are blocked by the signals 16 and 17, whereby the other request 13 is inhibited from being set in the associated flip-flop 5. Further, the selecting circuit 8 is enabled by the select signal 14 or 15 (signal 14 according to the above assumption) to select the address signal 18 from the BPU or the refresh address signal 19 (the address signal 18 in the illustrated case). The selected address signal 18 is then placed in the address register 9. As will be appreciated, it is impossible with the illustrated circuit arrangement to place the address signal 18 from the BPU in the address register 9 until the select signal 14 has been input to the selecting circuit 8 in response to the reception of the access request signal 10.

FIG. 3 illustrates another example of a known selector circuit for a memory unit. In this case, it is assumed that the access source is constituted by a pair of storage control units which will hereinafter be referred to as SCUA and SCUB, respectively, to distinguish them from each other. It is further assumed that the generation of the access requests to the memory unit from the control units SCUA and SCUB is so sequenced that both the access requests are not simultaneously issued. Further, the units SCUA and SCUB are so controlled that the access requests are held by these units when the memory unit is being used. The access requests are then dispatched when the memory unit is free of use. FIG. 4 illustrates a signal-timing diagram to illustrate operation of the circuit arrangement illustrated in FIG. 3. In the figures, 40 and 41 denote flip-flops for temporarily holding the access requests from SCUA and SCUB, respectively, 42 denotes an OR gate, 43 denotes an AND gate, 44 and 45 represent the access request signals from the SCUA and SCUB, respectively, and 48 and 49 represent address signals issued from the SCUA and SCUB, respectively. Referring to FIG. 3, the access request signal 44 or 45 transmitted from the SCUA or SCUB is set in the flip-flop 40 or 41 under the timing of a clock pulse T2. Of course, the control is so made in the SCUA and SCUB that both the access requests 44 and 45 are not issued simultaneously. Consequently, it will never occur that both the flip-flops 40 and 41 are simultaneously set, but either the flip-flop 40 or 41 is selectively set in dependence on whether the access request 44 or 45 is generated. The illustration shown in FIG. 4 is based on the assumption that the access request 44 is issued from the SCUA. When the flip-flop 40 (or 41) is set, the signal 46 (or 47) which is the output of flip-flop 40 (or 41) opens the selecting circuit 8 thereby to gate selectively the address signal 48 from the SCUA (or the address signal 49 from SCUB) to the address register 9 as indicated at 20. Since the OR gate 42 produces an output in response to the previously described signal 46 (or 47) at that time, the output signal 20 from the selecting circuit 8 is placed in the address register 9 in timing with a clock pulse T3 under the control of the AND gate 43. When the clock signal T2 is produced in the second cycle 2, the access request 44 (or 45) is reset to logic "0", resulting in that both the previously described signals 46 and 47 are also logic "0". Consequently, the OR gate 42 is blocked, whereby the up-dating of the contents in the address register 9 is inhibited. As will be understood, in the case of the circuit arrangement shown in FIG. 3, the address signal 48 can be accepted during a time interval between the clock or time point T2 at which the access request 44 is placed in the flip-flop 40 and the time point T3 at which the address signal 48 is set in the address register 9.

As will be appreciated from the foregoing elucidation, in the known selector circuit control of selection of input signals such as address signals produced in association with access request signals such as memory request signals is effected after it is determined which of the memory request signals is selected. Thus, acceptance of an input signal such as an address signal associated with the memory request signal is delayed, which causes an undesirable increase of the access time. More particularly, a loss in the access time is involved in the interval between the reception of the access request 10 and the supply of the select signal 14 to the selecting circuit 8 in the case of the selector circuit shown in FIG. 1, and between the time points T2 and T3 in the case of the circuit shown in FIG. 3. Further, in the case of the circuit of FIG. 3 when the access requests 44 or 45 issued from the storage control units SCUA or SCUB and transferred in phase with the address signal 48 or 49, respectively, the selecting circuit 8 is not enabled until the select signal 46 or 47 has been generated, as the result of which the time for receiving the address signal 48 or 49 is reduced. Consequently, the duration of the input signal 20 to the address register 9 becomes shorter than that of the access request signal 44 or 45, whereby the margin of timing for the transfer of the signal such as address signal from the storage control unit to the memory unit is undesirably decreased.

SUMMARY OF THE INVENTION

An object of the present invention is to eliminate the difficulties of the known selector circuits described above and provides an improved memory apparatus which can be operated at a high speed with an enhanced reliability.

An access request selecting circuit in accordance with the invention for selectively accepting one by one access request signals produced from a plurality of access request sources includes a circuit for assigning recurrent time intervals to individual access request sources; a first access request taking circuit coupled to said time interval assigning circuit so that for a series of recurrent time intervals only an access request signal produced from that access request source to which said series of recurrent time intervals are assigned is accepted; and a second access request taking circuit coupled to said time interval assigning circuit so that an attendant signal produced by said second access request source in association with said access request signal is accepted independently of the operation of said first access request taking circuit.

DESCRIPTION OF THE PREFERRED EMBODIMENTS

Figure 1:
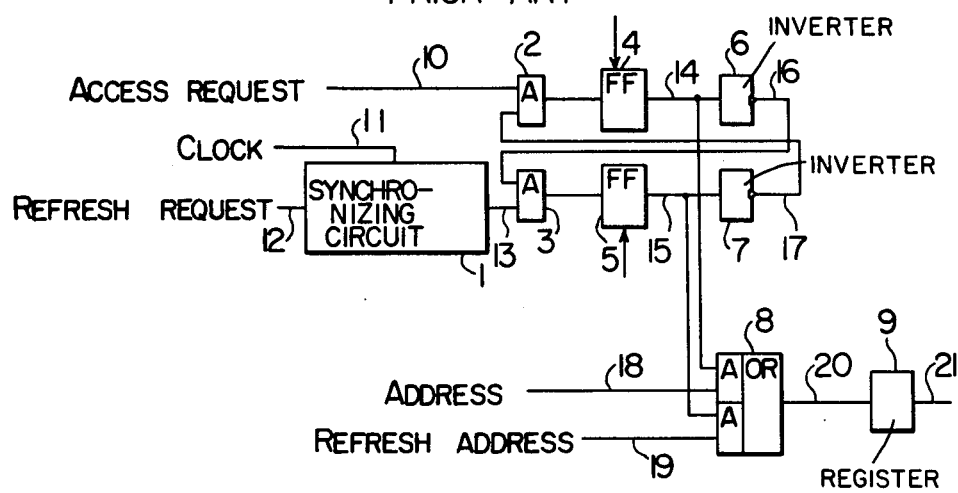
FIG. 1 illustrates schematically a general arrangement of a hitherto known memory access selection control circuit.
Figure 2:
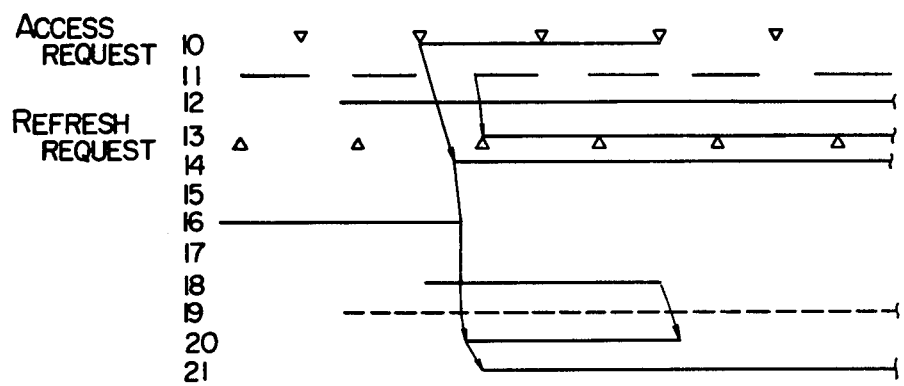
FIG. 2 illustrates a signal-timing diagram to illustrate operation of the circuit shown in FIG. 1.
Figure 5:
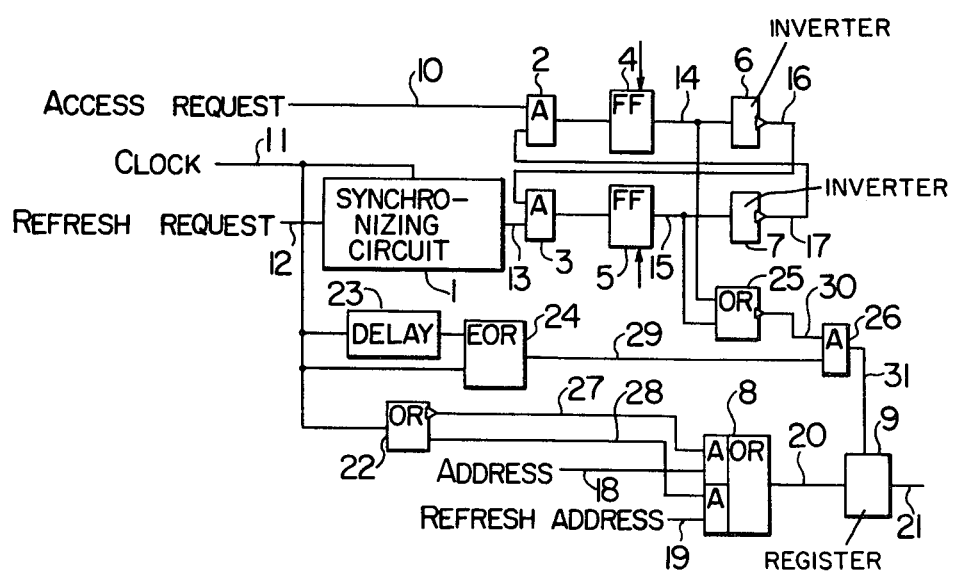
FIG. 5 illustrates a general arrangement of a memory access selection control circuit according to an embodiment of the invention.
Figure 6:
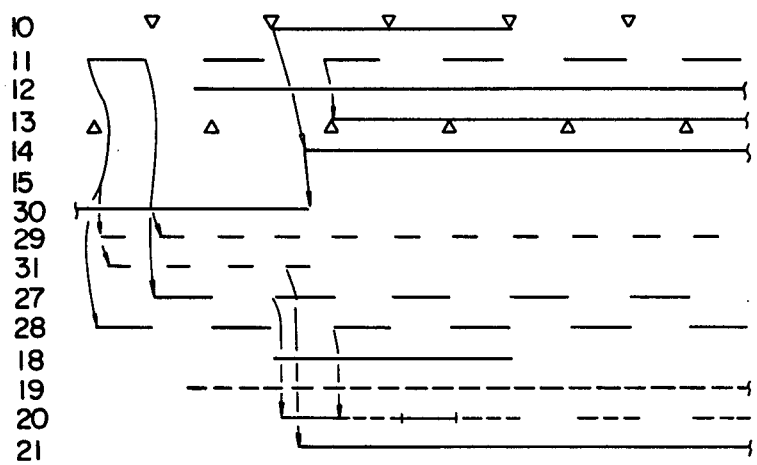
FIG. 6 illustrates a signal-timing diagram to illustrate operation of the circuit shown in FIG. 5.

Now, the invention will be described in detail in conjunction with exemplary embodiments thereof. FIG. 5 illustrates a selector circuit which corresponds to the one described hereinbefore in connection with FIG. 1 and to which the invention is applied, and FIG. 6 illustrates a signal-timing chart for illustrating operation of the circuit shown in FIG. 5. In the figures, reference numeral 22 denotes a NOR/OR gate, 23 denotes a delay circuit, 24 denotes an Exclusive-OR gate, 25 denotes an OR gate, 26 denotes an AND gate, 27 and 28 represent a processing unit or BPU select signal and a refresh request select signal, respectively, 29 a timing signal, 30 a signal for inhibiting the timing signal 29, and 31 represents a trigger signal for an address register 9. Other reference numerals same as those used in FIG. 1 denote or represent the same or equivalent items. In FIG. 5, after the access request 10 or the synchronized refresh request is issued, the AND gates 2 and 3 are blocked by the signals 17 and 16, respectively, whereby either the request 13 or 10 which has not yet been set is inhibited in the same manner as described hereinbefore in conjunction with FIG. 1. However, in contrast to the circuit arrangement shown in FIG. 1 where the selecting circuit 8 is enabled or opened by the signal 14 or 15, the selecting circuit 8 of the arrangement shown in FIG. 5 is enabled by the select signal 27 or 28 which is constantly applied thereto from a clock 11 through the NOR/OR gate 22 independently from the access request signal 10 or the refresh request signal 12. More specifically, the select signal 27 is previously generated from the clock 11 at the time points at which the access request 10 is supplied (refer to the inverted triangular marks in FIG. 6), while the select signal 28 is previously produced as derived from the clock 11 at the time points at which the synchronized refresh request signal 13 is generated (refer to the triangular marks in FIG. 6). The clock 11 is further used to enable the delay circuit 23 and the Exclusive-OR circuit 24 to thereby generate a timing signal 29. This timing signal 29 is such that the delay circuit 23 generates a pulse having a width large enough to trigger the register 9 and that the gate 26 is opened by the Exclusive-OR circuit 24 with the timing represented by symbols ($\nabla$) and ($\Delta$). Additionally, in order to hold in the address register 9 the address signal 18 or refresh address signal 19 which is received through the selecting circuit 8 simultaneously with the access request signal 10 or refresh request signal 13, the inhibit signal 30 is derived from the signal 14 or 15 through the NOR gate 25 to block the AND gate 26 for inhibiting the timing signal 29. Assuming now that the access request 10 is selected, as is illustrated in FIG. 6, the selecting circuit 8 will then select the address signal 18 supplied from the BPU, because the select signal 27 is logic "1" when the access request is produced. Consequently, the address signal 18 makes appearance at the output of the selecting circuit 8. Simultaneously with the placing of the access request 10 in the flip-flop 4, the output signal from the selecting circuit 8 is set in the address register 9 under the control of the trigger signal 31. When the flip-flop 4 is thus set, the inhibit signal 30 derived from the signal 14 for inhibiting the timing signal 29 becomes logic "1", causing thereby the trigger signal 31 to be logic "0". As the consequence, the contents in the address register 9 is prevented from being updated, whereby the address signal 18 is held by the address register 9. In this manner, it is possible with the circuit arrangement shown in FIG. 5 and described above to set or place the address signal 18 supplied from the BPU in the address register 9 simultaneously with the reception of the access request signal 10, as is apparent from FIG. 6.

Figure 3:
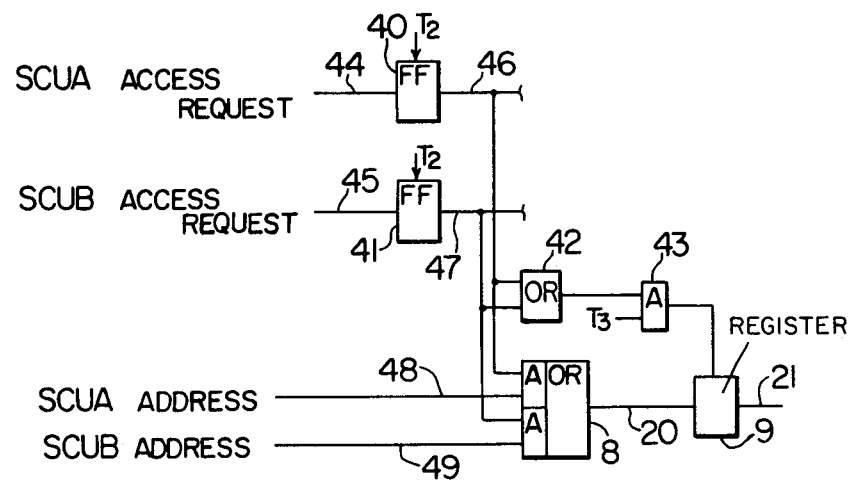
FIG. 3 illustrates another memory access selection control circuit of the prior art.
Figure 4:
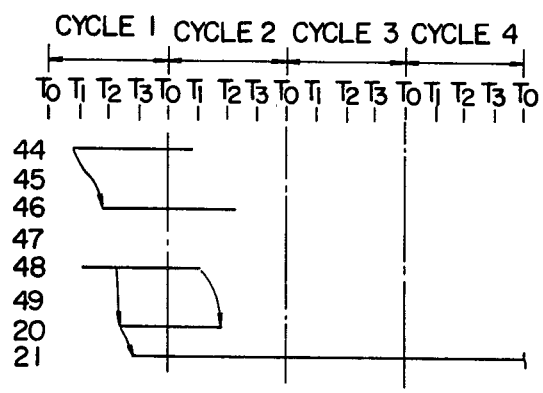
FIG. 4 is a signal-timing illustrating operation of the circuit shown in FIG. 3.
Figure 7:
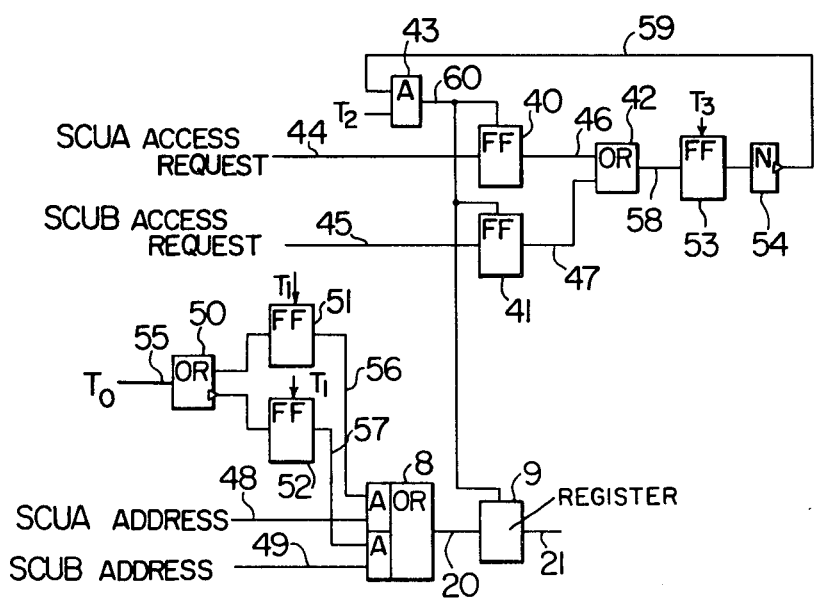
FIG. 7 illustrates another embodiment of the invention.
Figure 8:
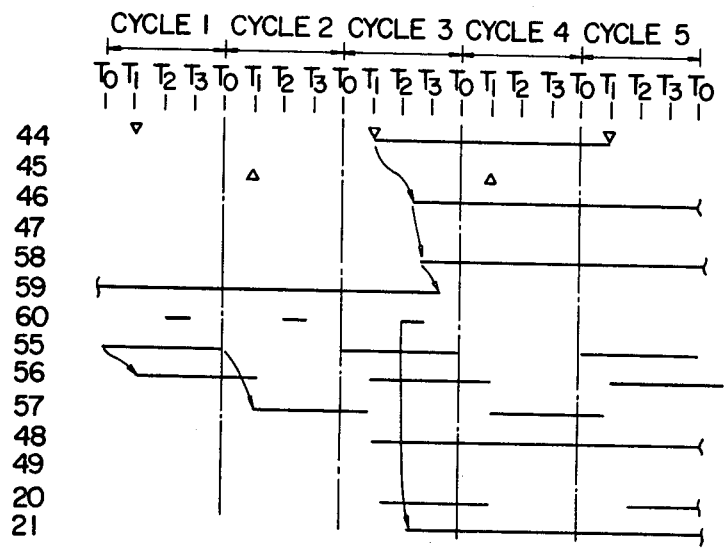
FIG. 8 illustrates a signal-timing diagram to illustrate operation of the memory access selection control circuit shown in FIG. 7.
Figure 9:
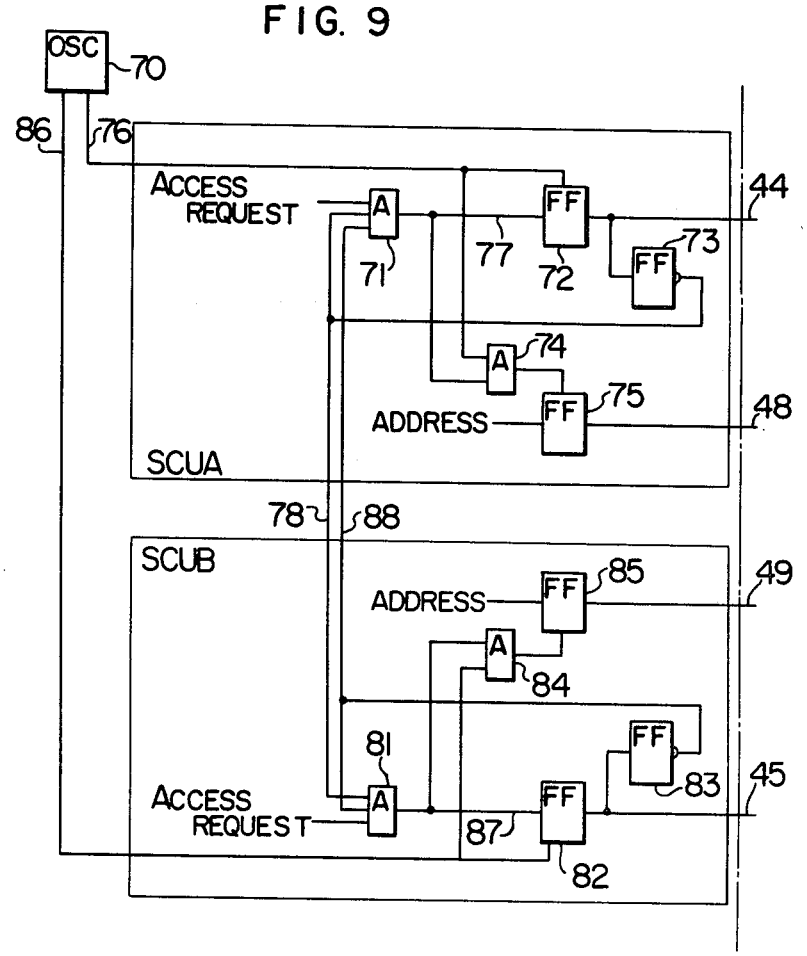
FIG. 9 illustrates in detail an arrangement of access sources shown in FIG. 7.
Figure 10:
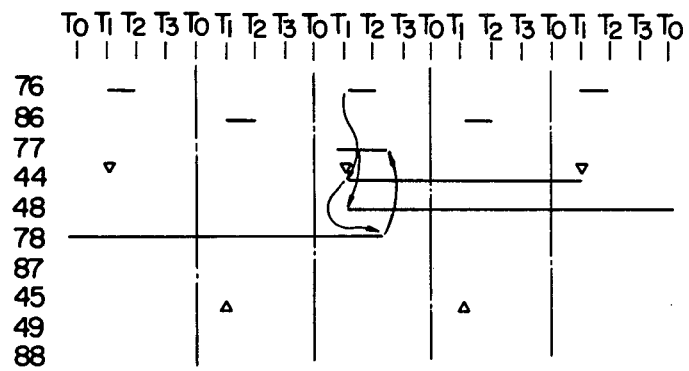
FIG. 10 illustrates a signal-timing diagram of operation of the arrangement shown in FIG. 9.
Figure 11:
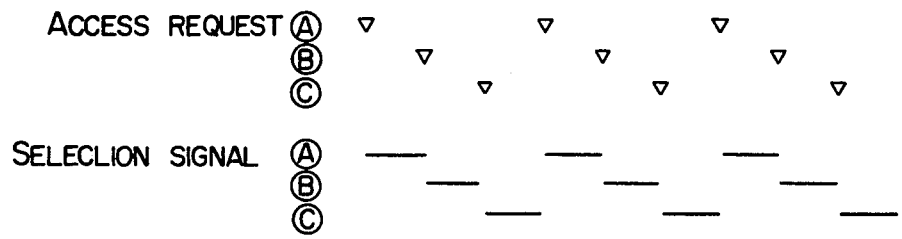
FIG. 11 illustrates graphically an example of an access issuance sequence.
Figure 12:
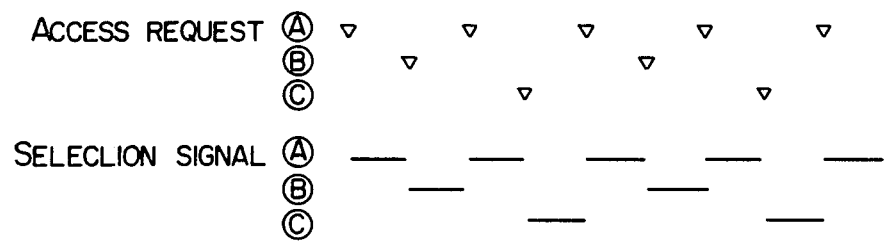
FIG. 12 illustrates graphically another example of an access issuance sequence.

FIG. 7 illustrates another embodiment of the invention applied to the hitherto known memory access selection control circuit described hereinbefore in conjunction with FIG. 3. FIG. 8 is a signal-timing diagram of the arrangement illustrated in FIG. 7. FIG. 9 illustrates schematically a typical access control circuit for the access sources having access to the memory unit which circuit is employed in the arrangement shown in FIG. 7. FIG. 10 illustrates a signal-timing diagram of the access control circuit shown in FIG. 9. Referring to FIGS. 7 and 8, reference numeral 50 denotes a NOR/OR gate, 51, 52 and 53 denote flip-flops, 54 denotes an inverter, 55 denotes a clock, 56 and 57 represent a SCUA select signal and a SCUB select signal, respectively, 58 represents the output signal of the OR gate 42, 59 represents a trigger inhibiting signal, and 60 represents a trigger signal. In FIGS. 9 and 10, reference numeral 70 denotes an oscillator, 71, 74, 81 and 84 denote AND gates, 72, 73, 75, 82, 83 and 85 denote flip-flops, 75 and 85 denote registers, 76 and 86 represent clocks, 77 and 87 represent output signals from the AND gates 71 and 81, respectively, and 78 and 88 represent a SCUA-busy signal and a SCUB-busy signal. In FIGS. 7 and 9, $T_0$–$T_3$ represent clock signals produced from the output of the oscillator 70 illustrated in FIG. 9. Clock $T_0$ is such a signal at 55 in FIG. 8 while clocks $T_1$–$T_3$ are generated in synchronism with $T_1$–$T_3$ shown on the top of FIGS. 8 and 10. Referring to FIG. 9, in the storage control units SCUA and SCUB, the flip-flops 72 and 82 are set by the clock signals 76 and 86, respectively, which are out of phase with each other by 180°, whereby the access request signals 44 and 45 are issued. By taking advantage of the phase difference of 180°, it is first ascertained that the memory unit is not being used by the counterpart SCU by exchanging the busy signals 78 and 88 between the SCUA and SCUB and thereafter the access request signal 44 or 45 is issued. As can be seen from FIG. 10, the access request signal 44 from the SCUA is issued at the time points marked by the inverted triangular symbols (▽), while the access request signal 45 from the SCUB is produced at the time points marked by triangles (△). The phase difference between these access request signals 44 and 45 is equal to 180°. In the case where the memory unit is not being used and thus accessible by the storage control unit SCUA or SCUB, the address signal accompanying the access request is set in the register 75 or 85 from the output 77 or 87 of the AND gate 71 or 81 to thereby update the address signal 48 or 49 to be supplied to the memory unit, in addition to the flip-flop 72 or 82 being set. FIG. 10 is based on the assumption that the access request 44 is issued by the SCUA. In the circuit arrangement shown in FIG. 7, the operation carried out until the flip-flop 40 or 41 has been set with the clock T2 in response to the reception of the access request 44 or 45 is same as in the circuit arrangement shown in FIG. 3. However, in contrast to the circuit of FIG. 3 where the selecting circuit 8 is enabled by the signal 46 or 47, which respectively are the outputs of the flip-flops 40 and 41 the selecting circuit 8 of FIG. 7 is enabled by the select signal 56 or 57 which is constantly and repeatedly issued as derived from the clock signal 55 from the oscillator 70 through the NOR/OR gate 50 and the flip-flop 51 or 52, independently from the issuance of the access request signal 44 or 45. In other words, the select signal 56 is previously produced as derived from the clock 55 at the time points at which the access request 44 makes appearance and which is marked by the inverted triangles (▽), while the select signal 57 is produced in a similar manner at the time points at which the access request 45 is supplied and which is marked by the triangular symbol (△). When both of the flip-flops 40 and 41 are set, the trigger inhibiting signal 59 is reset to logic level "1", thereby to allow the trigger signal 60 for the flip-flops 40 and 41 and the address register 9 to be repeatedly generated for every clock signal T2. When when the flip-flop 40 or 41 is set upon reception of the access request 44 or 45, the trigger inhibiting signal 59 is reset to logic "0" by the previously described signal 46 or 47 through the OR gate 42, flip-flop 53 and the inverter 54, whereupon the AND gate 43 is blocked and thence the trigger signal 60 is reset to logic "0". The address register 9 is then inhibited from being updated. Thus, the address signal 48 or 49 which has been received simultaneously with the reception of the access request 44 or 45 and placed in the address register 9 through the selecting circuit 8 is held as it is. Accordingly, in the case of the embodiment now being described, it is possible to set the address signal 48 supplied from the SCUA in the address register 9 at the timing of the clock signal T2 simultaneously with the reception of the access request signal 44 issued from the SCUA. Further, by virtue of such arrangement that the select signal 56 or 57 can be previously generated, the margin of timing for transferring the access request 44 or 45 and the address 48 or 49 from the SCUA or SCUB even in the same phase can be selected to be large without giving adverse influence to the address signal 48 or 49 as is in the case of the known circuit arrangement illustrated in FIG. 3. In the foregoing, only the address signal has been described as the input signal supplied in company with the access request. However, it will readily be understood that the input signal may of course include an operation mode command signal, data to be stored and the like which are sent to the memory unit together with the access request. Besides, the invention can equally be applied to the case where three or more access sources are present. In the case of three access sources, the phase difference of the clock signals allotted to the access requests from the individual access sources is selected equal to 120° as shown in FIG. 11, wherein the access requests from the three sources are scanned sequentially with equal interval. It goes without saying that the invention can be applied to the system where four or more access sources are provided through corresponding modifications which fall within the scope of the invention. Furthermore, the invention can be applied also to the case where the access sources issue the respective access requests at different frequencies, so far as the scanning of the access requests is carried out periodically. For example, the invention can be applied also to the signal sequence illustrated in FIG. 12 in which different access requests B and C are issued once while access request A is issued twice in the meantime.

As will be appreciated from the foregoing description, the invention provides an access request selecting circuit for selectively accepting access request signals from a plurality of access request sources, in which a high speed operation is assured for a memory apparatus by virtue of the arrangement that delay of acceptance of input signals associated with memory request signals can be suppressed.

I claim:

1. A memory apparatus having a selector circuit for controlling accesses to said memory from a plurality of access sources which issue respective access request signals and address information, said selector circuit comprising:
    an address latch;
    first means for accepting a preceding access request and issuing a select signal;
    second means for receiving said address information;
    third means for generating a set signal periodically for setting the received address information in said latch; and
    fourth means for responding to said select signal to thereby inhibiting operation of said third means after the address information corresponding to the accepted request has been set in said address latch.

2. A memory apparatus set forth in claim 1, wherein said access request signal and said address information are supplied simultaneously to said selector circuit, said first, second and third means being operated in synchronism with one another.

3. A memory apparatus having a selector circuit for controlling accesses to said memory from a plurality of access sources which issue respective access request signals and address information, wherein said access requests are so synchronized as to be issued at respective periodical timings which differ in phase for every one of said access sources, said selector circuit comprising:
    an address latch;
    first means for accepting the preceding one of said access requests and issuing a select signal;

second means for receiving the address information corresponding to the incoming access request at the same timing as said access request;

third means for responding to the timings of all of said access sources and producing periodically set signals for setting the received address information in said latch; and fourth means for responding to said select signal to thereby inhibit the operation of said third means.

4. A memory apparatus set forth in claim 3, wherein said second means includes a plurality of AND gate circuits each receiving the address information from the associated one of said access sources and adapted to be opened with the timing with which the access request associated with said address information is applied to said first means, and an OR gate circuit having inputs supplied with the output signals from said AND gate circuits and adapted to produce an output signal applied to said latch.

5. A memory apparatus set forth in claim 3, wherein said access request signals include access requests issued at said timing at different frequencies.

6. A memory apparatus having a selector circuit for controlling accesses to said memory from a plurality of access sources which issue respective access request signals and address information, said selector circuit comprising:

first means for accepting the preceding one of said access requests and producing a select signal;

second means for receiving and holding all of the address information supplied thereto; and third means for responding to said select signal to thereby validate the address information corresponding to the accepted access request and held in said second means.

7. A memory apparatus set forth in claim 6, wherein said second means is adapted to hold only the fresh received address information, while said third means is adapted to respond to said select signal to thereby inhibit said second means from holding the subsequently received address information.

8. A memory apparatus set forth in claim 6, wherein the address information is supplied simultaneously to said first and second means, and the address information corresponding to a given one of said access requests is held in said second means in precedence to generation of said select signal by said first means in response to said given access request.

9. An access request selecting circuit for selectively accepting one by one access request signals produced from a plurality of access request sources in which said sources also issue attendant signals, comprising:

means for assigning recurrent time intervals to individual access request sources;

a first access request taking means coupled to said time interval assigning circuit so that for recurrent time intervals assigned to any one of said individual access sources only an access request signal produced from that one said access request source to which said recurrent time intervals are assigned is accepted; and a second access request taking means coupled to said time interval assigning circuit so that an attendant signal produced by said access request source in association with said access request signal is accepted independently of the operation of said first access request taking means.

10. An access request selecting circuit in accordance with claim 9 wherein (a) a pair of access sources are provided;

(b) said means for assigning recurrent time intervals comprises a clock having an output on which a first clock signal is produced, an OR gate having an input coupled to the output of the clock and a pair of outputs, one of said OR gate outputs being inverted, a first pair of flip-flops each having an input being respectively coupled to a different one of the outputs of the OR gate for storing the signal states of the outputs of the OR gates and an output;

(c) said first access request taking means comprises a second pair of flip-flops for storing respectively a different one of the pair of access request signals produced by the pair of access request signal sources, each of the second pair of flip-flops having an input coupled to a different one of said access signal sources, a reset terminal coupled to a source of reset signals and an output, the outputs being coupled together into a common output; and (d) said second access request taking means comprises a gating means having a pair of inputs coupled respectively to a different source of attendant signals for passing an attendant signal present on one of the inputs to an output when a gating signal for that input is present on a gating terminal associated with that input, said gating terminals being respectively coupled to the outputs of said first pair of flip-flops and a gated register means having an input coupled to the output of said first gating means and a control gate which is coupled to the common output and a source of a second clock signal for controlling the storage of an attendant signal in said register means.

11. An access request selecting circuit in accordance with claim 10 wherein said attendant signals are addresses within a memory.

12. An access request selecting circuit in accordance with claim 11 wherein said first access request taking means functions to produce a signal permitting the storage of address information by said gated register means upon the presence of the second clock signal coupled to said control gate of said gated register means and blocking the storage of information after the presence of the second clock signal and an access request signal.

13. An access request selecting circuit in accordance with claim 12 wherein said gating means comprises a pair of AND gates each having a pair of inputs and an output coupled to a common OR gate one of said inputs of each AND gate being coupled to a different source of address signals and the other input of each input being coupled to a different one of the outputs of the first pair of filp-flops.

14. An access request selecting circuit for selectively accepting access request signals produced from a plurality of access request sources in which the individual access request sources include a control storage unit for generating an address of information to be addressed in a memory unit comprising:

(a) means coupled to said plurality of access request sources for controlling the selective accepting of the access request signals so that the access request signals produced by any one of said plurality of access request sources are accepted sequentially in non-overlapping time intervals with respect to the time intervals in which the other access request sources selectively accept access request signals; and (b) selection circuit means coupled to said plurality of access request sources for transferring an address generated by any one of said access request sources independent of the operation of the means for controlling only during the time interval that the means for controlling accepts the access request signal from the said one access request source which generated the address.

* * * * *